Jan. 18, 1938.　　　　A. F. WELCH　　　　2,105,514
SELF REVERSING MOTOR DRIVE
Filed July 22, 1936　　　　3 Sheets-Sheet 1
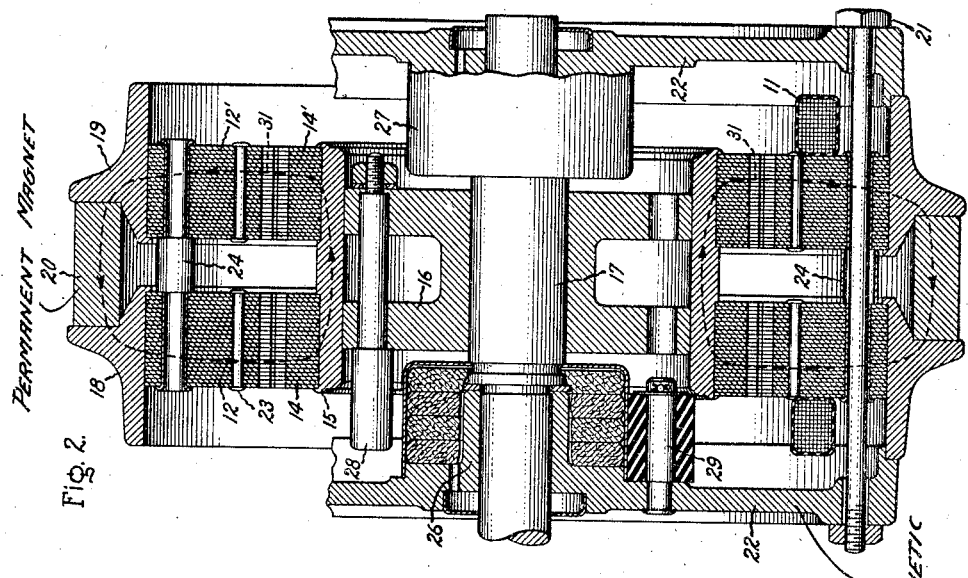
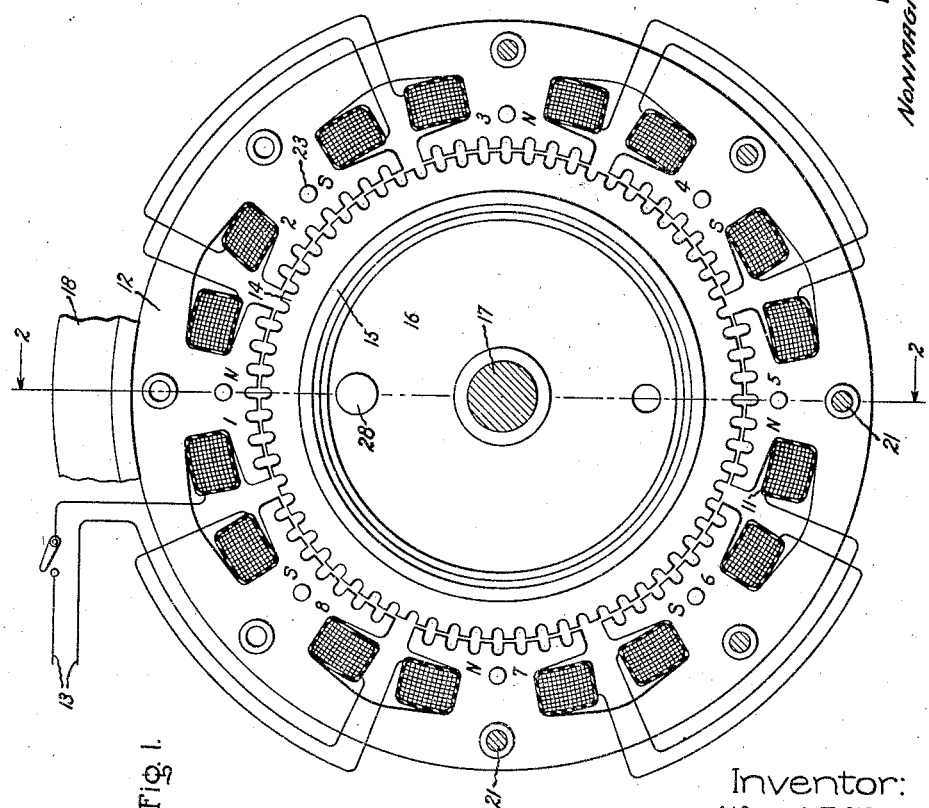
Inventor:
Alfred F. Welch,
by Harry E. Dunham
His Attorney.

Jan. 18, 1938.   A. F. WELCH   2,105,514
SELF REVERSING MOTOR DRIVE
Filed July 22, 1936   3 Sheets-Sheet 2

Inventor:
Alfred F. Welch,
by Harry E. Dunham
His Attorney.

Jan. 18, 1938.  A. F. WELCH  2,105,514
SELF REVERSING MOTOR DRIVE
Filed July 22, 1936  3 Sheets-Sheet 3

Inventor:
Alfred F. Welch,
by Harry E. Dunham
His Attorney.

Patented Jan. 18, 1938

2,105,514

UNITED STATES PATENT OFFICE 2,105,514

SELF-REVERSING MOTOR DRIVE

Alfred F. Welch, Fort Wayne, Ind., assignor to General Electric Company, a corporation of New York Application July 22, 1936, Serial No. 91,942

3 Claims. (Cl. 172—278)

My invention relates to a self-reversing electric motor and a new method of reversing and its application to the driving and operation of various loads in a novel manner wherein the motor is largely self-controlling. An important object of my invention is to eliminate the necessity of employing reversing circuit control arrangements or mechanical reversing mechanisms in order to reverse the direction of rotation of the driving motor or the driving connection between it and its load when a reversal is required. Another important object of my invention is to make certain electric drives safer to use as regards the operator, the apparatus or tool driven, and the driving motor itself.

In carrying my invention into effect I make use of a driving motor which is inherently self-reversing when it encounters a predetermined load. I then utilize this motor characteristic to control the motor in those motor drive applications where reversing, quick stopping and selective directional rotation of the motor is desirable for any reason.

The features of my invention which are believed to be novel and patentable will be pointed out in the claims appended hereto. For a better understanding of my invention, reference is made in the following description to the accompanying drawings wherein Figs. 1 and 2 show plan and sectional views of one form of electric motor which is inherently self-reversing in the manner contemplated, and which therefore is one that may be utilized in the present invention. This motor is of the single phase inductor type and requires, in addition to an alternating flux, a unidirectional flux and Figs. 3 and 4 show flux curves of such a motor which will be referred to in explaining the operation of the motor.

Fig. 5 represents my invention as embodied in an agitator type washing machine drive. Figs. 6, 7, 8, and 9 are explanatory figures of details of the drive of Fig. 5. Fig. 10 represents the invention as applied to a clothes wringer drive.

Figure 3:
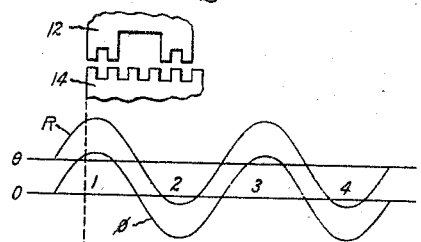

Referring now, primarily, to Figs. 1 and 2, I will first explain the motor structure. As shown in Fig. 2 there is, in fact, two motor units arranged side by side but energized by the same set of AC stator coils 11. This is not essential but by such double motor unit structural arrangement, and economical use of material is obtained as will be apparent. Each motor unit, where two units are used, will be substantially similar and only one needs to be explained in detail. Fig. 1 may therefore be taken to represent the stator and rotor laminations and coil assembly for one unit although as shown in Fig. 2 the same set of stator coils 11 serve for both units. For convenience the rotor unit to the left in Fig. 2 will be explained with the understanding that except as hereinafter pointed out the explanation applies also to the unit at the right in Fig. 2.

The stator comprises magnetic laminations 12 having an outer shell with inwardly projecting polar salients which for convenience are numbered from 1 to 8 respectively. These salients are wound with coils 11 connected in series to a single phase source 13, alternate coils being connected for reverse polarity. The alternating current flux polarity at a given instant may be designated by N and S on the salients. Thus the odd numbered salients are designated N and the even numbered salients are designated S.

The rotor comprises washer shaped magnetic laminations 14, supported on a magnetic spider part 15, a magnetic hub part 16 and shaft 17, the shaft 17 preferably being of non-magnetic material. It will be noted that the spider 15, hub 16 and shaft 17 serves for both rotor units and the spider 15 serves as a magnetic path between the inner peripheries of both rotor units 14 and 14'.

The two sets of stator laminations 12 and 12' are held in magnetic shell sections 18 and 19 between which is inserted a cylindrical shaped permanent magnet 20 having its poles at opposite ends. Non-magnetic end shields 22 are provided and the complete stator assembly is secured together as by non-magnetic bolts 21 or in any other desired fashion. 23 designates rivets for the stator lamination groups and 24 spacers between stator units. The bolts 21 and spacers 25 will be of non-magnetic material. It will thus be apparent that the permanent magnet 20 produces a unidirectional flux through both stator and rotor units as indicated by dotted lines 31, the direction of this flux in one unit being radially outward and in the other unit radially inward.

It is desirable that this unidirectional flux cross the air gap and polarize the stator salients and some or all of the parts such as the end shields 22, the bolts 21, spacers 24 and shaft 17, are made of non-magnetic material in order to avoid shunt paths for this unidirectional flux produced by the permanent magnet 20. In order to provide a suitable permanent magnet of the shape necessary for this compact, economical construction, it is essential to select a permanent magnetic material of high coercive force and a material which I have used satisfactorily is that described in United States Patent No. 1,968,569, Ruder, July 31, 1934. The end shields 22 support suitable bearing structures 26 and 27 for the shaft 17. The particular motor illustrated was designed for directly driving a washing machine agitator where the motion desired is oscillatory and a stop pin 28 fastened to the rotor is provided to strike against a rubber covered stop pin 29 secured to the end shield 22 to limit the oscillatory movement of the rotor.

It is noted in Fig. 1 that the stator salient pole faces and the adjacent rotor periphery are provided with teeth. The spacing of the teeth in each stator salient is the same as the uniform spacing of the teeth in the rotor. However, the teeth in the stator salients of one AC polarity are offset one-half tooth pitch from the teeth in the stator salients of the reversed polarity. Thus for the rotor position shown in Fig. 1, the teeth in the north pole stator salients 1, 3, 5 and 7 are in line with the rotor teeth while the teeth in the negative stator salients 2, 4, 6 and 8 come opposite rotor slots. The stator teeth in both stator units 12 and 12' are in alignment. However, the teeth in rotor unit 14' are staggered from alignment with the teeth in rotor unit 14 by one-half tooth pitch. The reason for this is because of the difference in the direction of the unidirectional flux in the two motor units, while the aligned AC stator salient polarity is the same in both units by reason of the common AC winding coils. It will presently appear that by this arrangement correct DC and AC flux relations for inductor motor operation will be present in both units.

The motor described may be termed a single phase synchronous inductor motor which if properly designed is self-starting but which may start equally well in either direction. It will be evident that in any rotor position the adjacent stator and rotor tooth area is the same and that therefore the DC flux which flows between stator and rotor produces no locking action at standstill and is not an impediment to starting the motor. It is important to employ a tooth arrangement where this condition of uniform air gap reluctance with respect to the permanent magnet flux in all rotor positions exists. By a self-starting motor, as used in the specification and claims, I mean a motor which requires no change in connections, energizing voltage, or manner in which energized between starting and running conditions, a motor which when unloaded immediately starts and comes up to normal speed when normally energized without the application of any external force and which will so start into operation from any rotative position of the rotor.

If the DC flux per tooth be made approximately equal to the maximum AC flux per tooth, the flux behavior may be pictured as in Fig. 3. Let O represent the zero flux line, $\phi$ the single phase AC flux and $\theta$ the constant DC flux between stator and rotor at salients 1, 2, 3 and 4, Fig. 1 when AC flux at salients 1 and 3 flow into the rotor, that at salients 2 and 4 out of the rotor and the DC flux flows from stator to rotor. The resultant flux will then be represented by R which is the algebraic sum of $\phi$ and $\theta$.

It is seen then at the instant represented the resultant flux at salients 1 and 3 is at a maximum value and that at salients 2 and 4 is approximately zero. A half cycle later the maximum flux will appear at salients 2 and 4 and the minimum flux at salients 1 and 3.

This condition holds true for the remaining salients of corresponding polarity so that we may consider the resultant flux of the motor as that of a four pole field having a spacing of alternate stator salients that travels about the stator in synchronism with the frequency and it may be considered to travel in a counterclockwise direction just as well as in a clockwise direction. If the frequency be 60 cycles this field travels about the stator at the rate of 900 R. P. M. If the corresponding salients of the other stator element 14' be considered at the same instant as represented in Fig. 3, the flux relations are as pictured in Fig. 4. The AC flux $\phi$ is the same but the DC flux flows from rotor to stator and may be designated by $-\theta$ so that the minimum resultant flux appears at salients 1 and 3 while the maximum flux appears at salients 2 and 4. Thus a four pole field of the same general character exists in the second motor unit but is shifted about one stator salient due to the fact that the DC radial flux is reversed in the two motor units.

Figure 4:
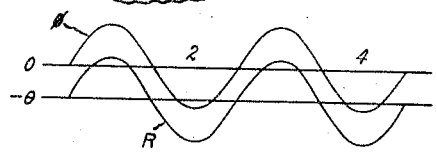

In stator 12 then the rotor teeth may align with the teeth in the salients 1 and 3, having a maximum flux, at the instant that the slots in the rotor come opposite the teeth in the salients 2 and 4 of minimum flux. While in stator 12', at the same instant under consideration, the teeth of rotor 14' may align with teeth in salients 2 and 4 which have maximum flux while the rotor slots come opposite teeth in salients 1 and 3 of minimum flux. This tooth alignment relationship is also indicated in Figs. 3 and 4.

Now it will be apparent that the motor described will have an inductor motor synchronous speed in either direction when the rotor revolves one tooth space per flux cycle. The rotor represented has 68 teeth and will thus have a synchronous speed of 52.94 R. P. M. on 60 cycles. Other speeds may of course be obtained by designing the motor for other numbers of rotor teeth.

If the inertia of the rotor of such a motor is kept at a reasonably low value in comparison to the frequency and is connected to its load if of considerable inertia by a relatively loose coupling so that the rotor may vibrate slightly in a rotational direction it is self starting but is apt to start in either direction of rotation and immediately comes to synchronous speed. Theoretically it might appear to be possible to place the rotor in an exactly balanced torque position, but actually this is not possible. As soon as the motor is energized it either starts instantly in one direction or the other or does so after a few cyclic rotary vibrations.

It will drive any load less than that corresponding to its pull out torque but when it encounters a load which it cannot carry at synchronous speed it immediately stops because its synchronous torque is greater than any torque below synchronous speed and if the motor remains energized when thus stopped by an overload in one direction it will immediately try to start in the opposite direction and will do so if not blocked.

Thus in Fig. 2, the motor when energized will start in one direction or the other and run at synchronous speed until the stop pin 28 comes against stop pin 29. The rotor will then immediately reverse and run at synchronous speed in the opposite direction until the stop pin 28 again comes against stop 29. The motor thus oscillates between the limits determined by the stop and if a load within the capacity of the motor is connected thereto it will oscillate such load as well. Moreover, the stopping device may be made as a resilient stop as by providing the rubber bushing shown about pin 29 so that as the motor is stopped in one direction of rotation a certain amount of kinetic energy is momentarily stored in the resilient stopping device which assists starting the motor and load in the opposite direction. This feature works in very well with the starting characteristics peculiar to the type of motor described.

A motor, not necessarily of the type described, but having the self-reversing characteristics described may be applied to considerable advantage in numerous applications and a few of them will now be described.

Figure 6:
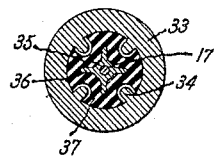
Figure 7:
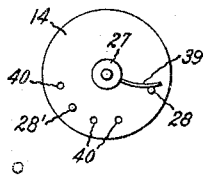

In Fig. 5, the motor is used for driving an agitator type washing machine. The motor is represented at 30 with its shaft at 17. The motor is fastened beneath the washer tank with its shaft vertical and extending upward through a suitable stuffing box. The agitator 32 is suitably mounted on the upper end of shaft 17 and is preferably connected in driving relation therewith through some form of flexible coupling. For example, the agitator may have a hollow central shaft section 33 with inwardly projecting ribs 34 (see Fig. 6). The shaft 17 may have a tubular member 35 secured thereto having outwardly extending ribs 36 thereon. Between parts 33 and 35 I may use a series of rubber washers 37 having slots for the ribs 34 and 36, thus providing a resilient torque coupling between motor shaft 17 and the agitator 32. The motor rotor 14 is provided with a stop pin 28 which cooperates with a resilient stop arm 39 secured in fixed relation to the stationary bearing hub 27. (See Fig. 7.)

Figure 8:
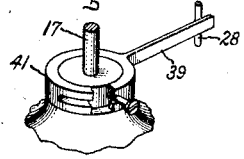

If less than a complete rotation of the agitator is desired another stop pin 28' may be provided in the rotor and different holes 40 may be provided so that the pin 28' may be inserted in any desired hole to select the extent of rotation most desirable. If more than a complete rotation is desired the resilient stop arm 39 may be fastened to a collar 41 (see Fig. 8) arranged to have a limited rotation on the bearing hub.

To operate the washer, the motor is connected to a source of alternating current 13 of the proper voltage and frequency through a switch 42. The motor starts into operation in one direction or the other and drives the agitator 32 at synchronous speed until blocked or stalled by pin 28 coming against stop arm 29. The pull out torque of the motor is exceeded at the same time energy is stored in resilient arm 39. The motor stops and immediately starts driving the agitator in the opposite direction until reversed at the other limit. This action is continued until the switch 42 is opened.

Figure 9:
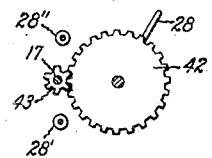

It will further be evident that in case a person in putting in clothes or removing clothes gets their hand caught while the washer is in operation and sufficient additional load is placed on the motor due to such accident to cause injury, such occurrence will act as a stop for the motor and it will immediately reverse and relieve the condition thus acting as a safeguard against serious injury. Likewise, if the clothes become tangled or wadded to such an extent as to cause an overload, the motor will reverse and operate with a shorter oscillating stroke until the condition is relieved. The same principle may be applied to large barrel washers where the operating stroke is several rotations by placing the stop pin 28 on a large gear 42 meshed with a small pinion 43 on the motor shaft 17, see Fig. 9.

It will be noted that all of the reversing gear mechanism usually employed on motor driven agitator mechanisms becomes unnecessary. This is advantageous because it reduces the expense, the noise, oiling, maintenance, control and the accident hazard incident to the use of reversing mechanisms. The power loss is very materially reduced and I may, therefore, employ a lower capacity motor because its power is applied directly to the work. In case the invention is to replace an installation where the driving motor is reversed by reversing one of its circuits, the present invention eliminates the extra circuits, switches and control thereof. No overload circuit breaker is required because, just the instant the motor becomes overloaded it reverses and temporarily backs away from the load. This feature will be of considerable importance in some applications of the invention.

Figure 10:
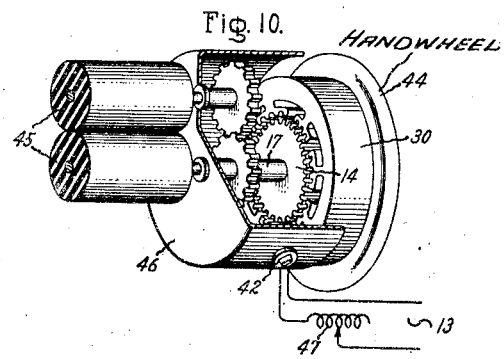

In Fig. 10 I have represented the self-reversing motor 30 applied to a clothes wringer. The motor rotor is provided with a smooth hand wheel 44 fastened to one end of its shaft 17. The other end of the shaft is geared to the wringer rolls 45.

46 represents a guard. Other details of the wringer are omitted. Here the direction of rotation is selected by the operator grasping the hand wheel 44 either initially when closing the switch 42 or in case the motor starts in the wrong direction. Oftentimes a person is injured by getting their hand caught in a wringer. In case this happens with the arrangement here represented the additional load applied to the motor will stall the motor and reverse it and relieve the situation before serious injury results. The exact motor torque, where this reversing will occur, may if desired be adjusted by connecting an adjustable impedance device 47 in the motor circuit. Roll driven ironers and other like devices may be equipped in the same way.

Figure 11:
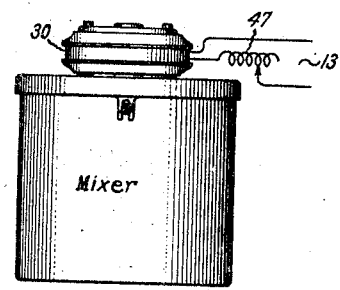
Fig. 11 shows the application of the invention for operating a mixer.

In Fig. 11, I have illustrated the self-reversing motor 30 applied to the operation of a mixer, such as an ice cream freezer or other mixers where—as the mixing or freezing proceeds, the load increases and it becomes desirable to vary the mixing operation as the product being mixed stiffens and in proportion thereto.

In this application the mixer starts in operation in either direction of rotation and may continue in rotation in one direction until the product stiffens and reverses the motor. The motor will then oscillate in opposite directions of rotation with shorter and shorter strokes as the stiffening proceeds until the process is completed, the pull out torque of the motor being adjusted by the adjustable impedance device 47 to accomplish the desired results.

Figure 12:
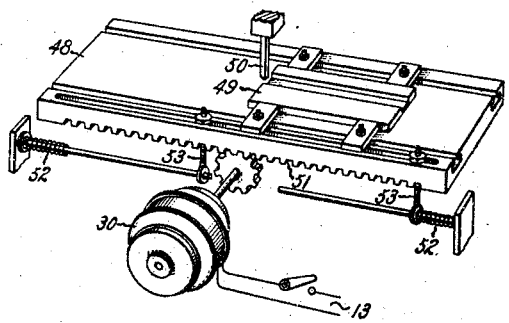
Fig. 12 illustrates the application of the invention to a shaper drive.

In Fig. 12, the self-reversing motor 30 is applied to the operation of a shaper mill. Here 48 represents the shaper table for holding the work 49, and 50 the cutting tool. The motor 30 is geared to a rack 51 for reciprocating the table 48. Resilient stop springs 52 are provided cooperating with adjustable stop 53 on the table. After setting the stop limits, and tool, and the tool feed not shown, the shaper may be set to work and left to itself. The extra load applied to the motor when the stop springs are compressed at the limits of stroke reverses the motor. The energy stored in the spring stops 52 incident to the reversing operation aids in starting the motor in the reverse direction. It will be evident that in case the tool 50 strikes a hard spot in the metal being worked, such as might break the tool or strip the gears at 51, or stall the usual motor and cause a burn out, the reversing characteristics of the motor will respond and back the tool away from the work if the pull out torque of the motor is proportioned properly.

Figure 13:
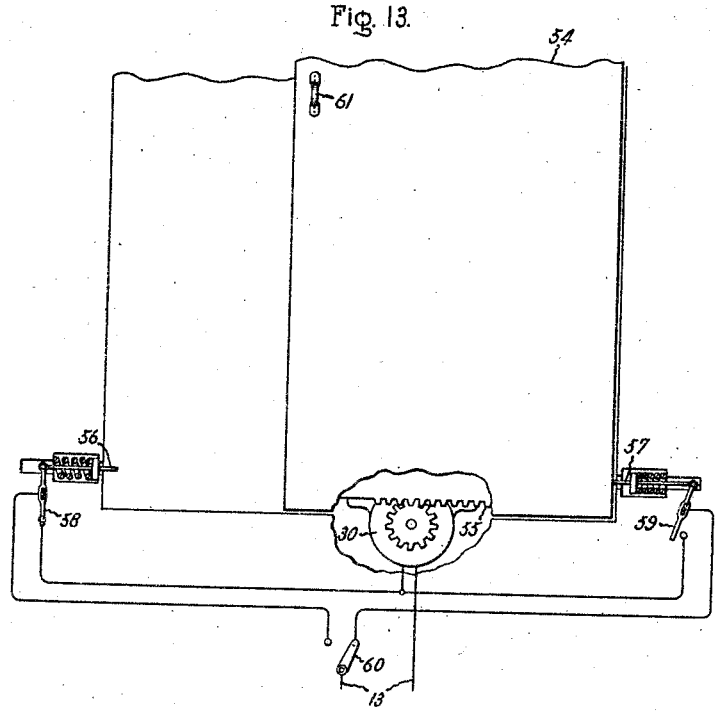
Figs. 13 and 14 show the application of my invention for operating an elevator door.

In Fig. 13, I have represented the invention as applied to the operation of an elevator door 54. The reversing motor is indicated at 30 geared to a rack 55 at the bottom of the door. Resilient stops 56 and 57 are provided at the limits established for opening and closing the door. The door is represented as closed with the resilient stop 57 under compression. In this case, I have also shown limit switches 58 and 59 operated by the stops, the contacts of which are connected in parallel with the contacts of the two way control switch 60. This is to prevent the door from opening when closed until the switch 60 is moved to door opening position.

Figure 14:
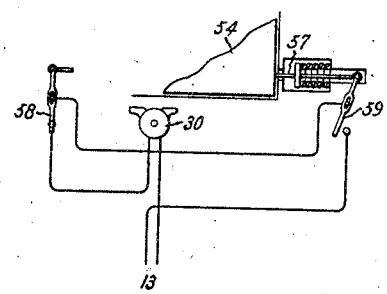

It will be noted that with the switches as represented the motor circuit is open, the spring at 57 is under compression, the door is closed and is prevented from opening by the locking action of the gears at 55 which can be of such ratio as to prevent the door from driving the motor under the urge of the resilient stop at 57. To open the door switch 60 is closed to the left and the motor is energized through limit switch 59. It immediately starts in the direction to open the door because it is urged in the proper direction by the energy stored in the resilient stop 57. When the door is fully opened it compresses the stop 56 and opens the motor circuit at limit switch 58 and locks itself in the open position until switch 60 is moved to the right to close the door again. It will be evident that if a person or object gets caught between the door and door jam when the door is being closed the extra load thrown on the motor causes its immediate reversal and automatically prevents serious injury. The door opening or closing operation can also be stopped at any point by opening switch 60 and a handle 61 may be provided to give the door a push in the desired direction to open or close the door when the switch 60 is closed again. Also the operator may reverse the movement of the door when the motor is in operation by grasping handle 61 and giving it a momentary tug in the reverse direction to the door movement without deenergizing the motor. In fact we may dispense with control switch 60 entirely and connect the limit switches in series between motor and source 13 as represented in Fig. 14. Here the limit switches 57 and 58 are represented in the positions corresponding to the door being closed. The motor is deenergized at switch 59. To open the door, the operator gives it a tug towards open position which tug aided by the spring at 57 is sufficient to start it and move it the small distance necessary to close the motor circuit at 59 after which the motor continues the opening process until the motor is deenergized by the opening of switch 58. To close the door the operator gives it an initial tug in the door closing direction.

While I have described several applications of the invention, numerous others will appear to those skilled in the art where the self-reversing motor drive principle may be applied to advantage to eliminate or reduce mechanical or electrical control mechanisms, reduce accident hazards to tools and persons, to automatically suspend an operation in case of overload, to obtain quick reversing operations, to simplify control problems, to obtain quietness in operation, to reduce power requirements and to obtain numerous other advantages possible by the intelligent application of this invention to the solution or simplification of various problems. In cases where the load has negligible inertia as would be the case for example in operating a reversible advertising card, no special loose coupling between the rotor and load will be required.

What I claim as new and desire to secure by Letters Patent of the United States is:

1. A reversible electric motor drive comprising, a self-starting reversible synchronous inductor motor, said motor having a magnetic stator part provided with an even number of salient pole pieces energized by a single-phase winding to produce alternating fluxes of opposite polarity in adjacent pole pieces, a rotor of magnetic material connected to the load to be driven and having a plurality of evenly spaced teeth in its periphery, similarly spaced teeth in the stator pole piece faces, the teeth in the stator pole pieces of one polarity at a given instant being aligned with the rotor teeth when the stator teeth in the pole pieces of the opposite polarity at the same instant are midway between the rotor teeth, permanent magnet means for producing a unidirectional homopolar flux between the stator and rotor of such value as to combine with the alternating-current fluxes of the stator pole pieces to produce a resultant field between the stator and rotor having half as many magnetic poles as there are stator poles, which resultant field may be visualized as rotating in either direction at the same speed as the single-phase field produced by the single-phase winding alone, said motor having a substantially uniform air gap reluctance to the unidirectional flux in all rotor positions and being self-starting and operable in either direction of rotation with equal facility, and means for reversing the direction of rotation of said motor while in normal operation in either direction comprising resilient stop means for stalling the motor at predetermined points in its range of rotation in either direction.

2. A reversible motor drive comprising, a pair of similar magnetic stator elements placed side by side, each stator element having an even number of inwardly projecting pole pieces with evenly spaced teeth in the faces of the pole pieces, the pole pieces in one stator element being in axial alignment with the stator pole pieces in the other stator element, common coils about the aligned stator pole pieces in the two stator elements, said coils being connected for energization from a single-phase alternating-current source to produce alternating-current fluxes of alternate polarity in adjacent pole pieces of the two stator elements, a rotor for each stator element comprising a magnetic core member provided with evenly spaced teeth in its periphery facing the teeth in the corresponding stator element, the teeth in the two rotor elements being staggered by one-half tooth pitch and their tooth spacing being the same as the tooth spacing in individual stator pole pieces, a magnetic connection between the two rotor core members, and a cylindrically-shaped permanent magnet between the outer portions of the two stator elements for producing homopolar unidirectional flux excitation in series relation between the stator and rotor elements, this flux being in one radial direction between one stator and rotor and in the opposite radial direction between the other stator and rotor, said structure comprising a pair of single-phase synchronous inductor motors energized by a common alternating-current winding and a common permanent magnet, said motor structure being self-starting in either direction of rotation and having similar operating characteristics in opposite directions of rotation, a common drive shaft for both motors, and means for reversing said motor unit when in normal operation in either direction of rotation comprising means for resiliently blocking further rotation of said rotor parts at the points in their range of rotation where it is desired that the reversals shall occur.

3. An electric motor drive comprising a member to be operated in reverse directions between predetermined limits, an electric motor connected to operate said member, said motor being of a type which is self-starting and operable in either direction of rotation with equal facility without change in the manner of its energization, a source of supply for said motor, resilient stop means positioned so as to be contacted by said member as said member approaches its limit of movement and to resiliently stop said member while the latter is being driven against such stop means by said motor, and means responsive to such stopping action for deenergizing said motor, said resilient stop means then serving, through its contact with said member and the driving connection to said motor, to provide the necessary bias to cause said motor to operate said member in the reverse direction when the motor is again energized.

ALFRED F. WELCH.